(12) United States Patent
Amsterdam et al.

(10) Patent No.: US 8,230,439 B2
(45) Date of Patent: Jul. 24, 2012

(54) GREEN COMPUTING INTERCHANGE SWITCHING FUNCTION

(75) Inventors: Jeffrey D. Amsterdam, Marietta, GA (US); Rick A. Hamilton, II, Charlottesville, VA (US); Brian M. O'Connell, Cary, NC (US); Clifford A. Pickover, Yorktown Heights, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1006 days.

(21) Appl. No.: 12/196,498

(22) Filed: Aug. 22, 2008

(65) Prior Publication Data

US 2010/0050180 A1 Feb. 25, 2010

(51) Int. Cl.
*G06F 9/46* (2006.01)
*G06F 9/455* (2006.01)

(52) U.S. Cl. .......................... 718/104; 718/1
(58) Field of Classification Search .............. 718/1, 100, 718/104; 717/158
See application file for complete search history.

(56) References Cited

U.S. PATENT DOCUMENTS

| | | | |
|---|---|---|---|
| 7,197,428 B1 | 3/2007 | Saghier et al. | |
| 7,281,097 B1 | 10/2007 | Lawson et al. | |
| 7,293,092 B2 | 11/2007 | Sukegawa | |
| 7,336,613 B2 | 2/2008 | Lloyd et al. | |
| 7,369,967 B1 | 5/2008 | Washburn et al. | |
| 7,369,981 B1 | 5/2008 | Saghier et al. | |
| 2004/0205759 A1* | 10/2004 | Oka | 718/102 |
| 2005/0120341 A1* | 6/2005 | Blumenthal et al. | 717/158 |
| 2008/0072232 A1* | 3/2008 | O'Toole | 718/104 |
| 2008/0301690 A1* | 12/2008 | Do et al. | 718/104 |
| 2009/0313145 A1* | 12/2009 | Hamilton et al. | 705/30 |

* cited by examiner

*Primary Examiner* — Thomas Lee
*Assistant Examiner* — Phil Nguyen
(74) *Attorney, Agent, or Firm* — Patrick J. Daugherty; Driggs, Hogg, Daugherty & Del Zoppo Co., LPA

(57) ABSTRACT

Systems, methods, devices and program products are provided for enabling users of a computing system to measure and compare the green efficiency of a set of resources used in a computing task. With the use of this information, the user can select a desired set of resources to be employed in the computing task to minimize the environmental impact of computing tasks in relation to requirements. In some embodiments, the invention creates metrics for measuring the greenness of a computing task. The metrics are calculated through analysis of the resource computation, energy consumption, consequence of computation, and dimensional characteristics of a computing task. The metrics could be beneficial or other metrics that permit the user or a processing system to make scheduling and execution decisions.

24 Claims, 2 Drawing Sheets

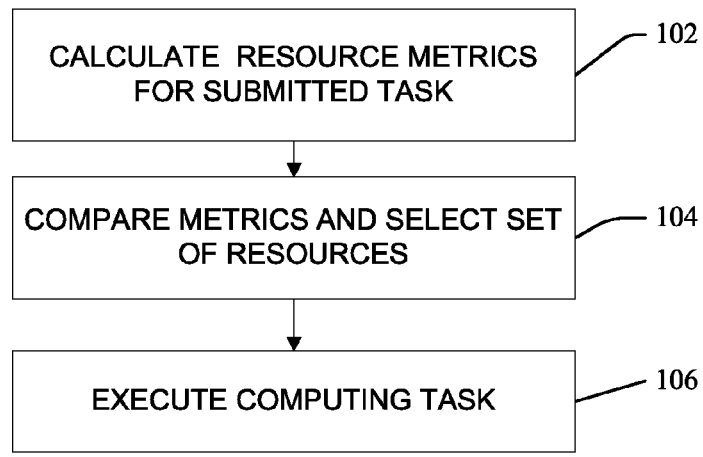
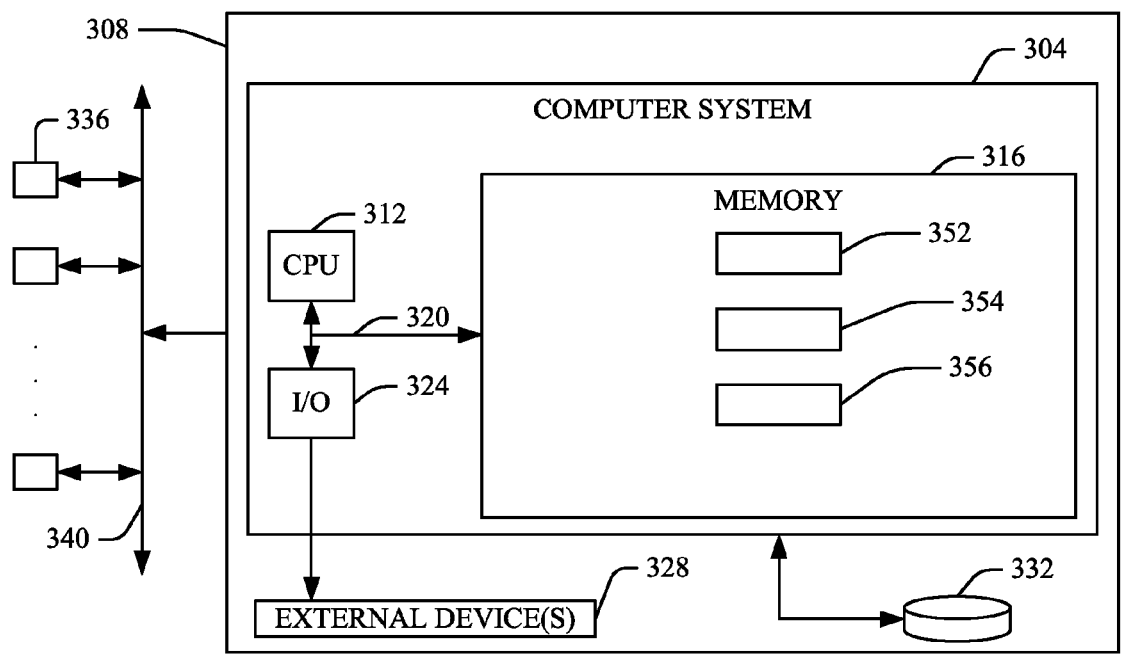

GREEN COMPUTING INTERCHANGE SWITCHING FUNCTION

FIELD OF THE INVENTION

The present invention generally describes a method, process, system and device for measuring and comparing the "green" efficiency of a set of resources used in a computing task.

BACKGROUND OF THE INVENTION

Green computing has been defined as the study and practice of using computing resources efficiently. Typically, technological systems or computing products that incorporate green computing principles take into account economic viability, social responsibility and environmental impact. In particular, green computing includes efforts to obtain maximized energy and resource efficiency from the computer resources being used, and in one aspect to reduce associated waste and negative environmental impacts. Green computing may also be described as the science behind efficient computing and performing tasks on a smaller power budget.

All computer usage consumes energy and, depending on the energy source, such usage may also increase greenhouse gas emissions. Both the United States Government as well as the information technology industry have recognized the importance of efficient computing in order to reduce greenhouse gas emissions resulting from energy or power consumption. Large government and commercial initiatives are underway to identify environmentally conscious information technology programs and the most efficient computers.

There are many factors which affect the energy consumption of computing resources. Such factors include those related to the computing task itself and a variety of external factors. For example, one factor which affects energy consumption related to the computing task includes the amount of time or computer cycles required to complete a computer task. Other factors which affect energy consumption include the time of day the computing task is performed, the geographic location in which the computing task is performed, network usage, heat generated by the computing device during the computational task, the amount of paper printed from a computational task, and other tasks scheduled to run concomitantly as the computing task.

SUMMARY OF THE INVENTION

In an embodiment of the invention, there is a method of alternative selection of a set of resources for a processing task in a computing system. The method comprises the steps of: a) providing a processing task; b) determining a resource metric value for performing the processing task for each of a plurality of processing resources; c) comparing the metric values; d) selecting a subset of the plurality of processing resources as a function of the comparing and a task performance requirement; and e) the selected subset of processing resources performing the task.

In an embodiment of the invention, there is a service enabling alternative selection of a set of resources for a processing task in a computing system. The service comprises providing a computational device infrastructure configured to: a) provide a processing task; b) determine a resource metric value for performing the processing task for each of a plurality of processing resources; c) compare the metric values; and d) select a subset of the plurality of processing resources as a function of the comparing and a task performance requirement and cause the selected subset of processing resources to perform the task.

In an embodiment of the invention, there is a method for enabling alternative selection of a set of resources for a processing task in a computing system. The method comprises the steps of: a) producing computer executable program code; b) storing the code on a computer readable medium; c) providing the program code to be deployed and executed on a computer system, the program code causing the computer to: i) provide a processing task; ii) determine a resource metric value for performing the processing task for each of a plurality of processing resources; iii) compare the metric values; iv) select a subset of the plurality of processing resources as a function of the comparing and a task performance requirement; and v) cause the selected subset of processing resources to perform the task.

In an embodiment of the invention, there is a programmable device, comprising: a) a processing means; b) a memory in communication with the processing means; c) a network interface in communication with the processing means and the memory; wherein the processing means is configured to: i) determine a resource metric value for performing a processing task for each of a plurality of processing resources; ii) compare the metric values; iii) select a subset of the plurality of processing resources as a function of the comparing and a task performance requirement; and iv) cause the selected subset of processing resources to perform the task.

BRIEF DESCRIPTION OF THE DRAWINGS

These and other features of the methods, systems and devices for measuring and comparing the "green" efficiency of a set of resources used in a computing task will be more readily understood from the following detailed description of the various aspects of the embodiments taken in conjunction with the accompanying drawings in which:

FIG. 1 is a flow chart illustrating a method for enabling users to measure and compare resource metrics used in a computing task and selecting resources as a function thereof according to an embodiment of the invention.

FIG. 3 is a block diagram illustrating a computerized device implementation configured to measure and compare metrics used in a computing task and select resources as a function thereof according to an embodiment of the invention.

Figure 2:
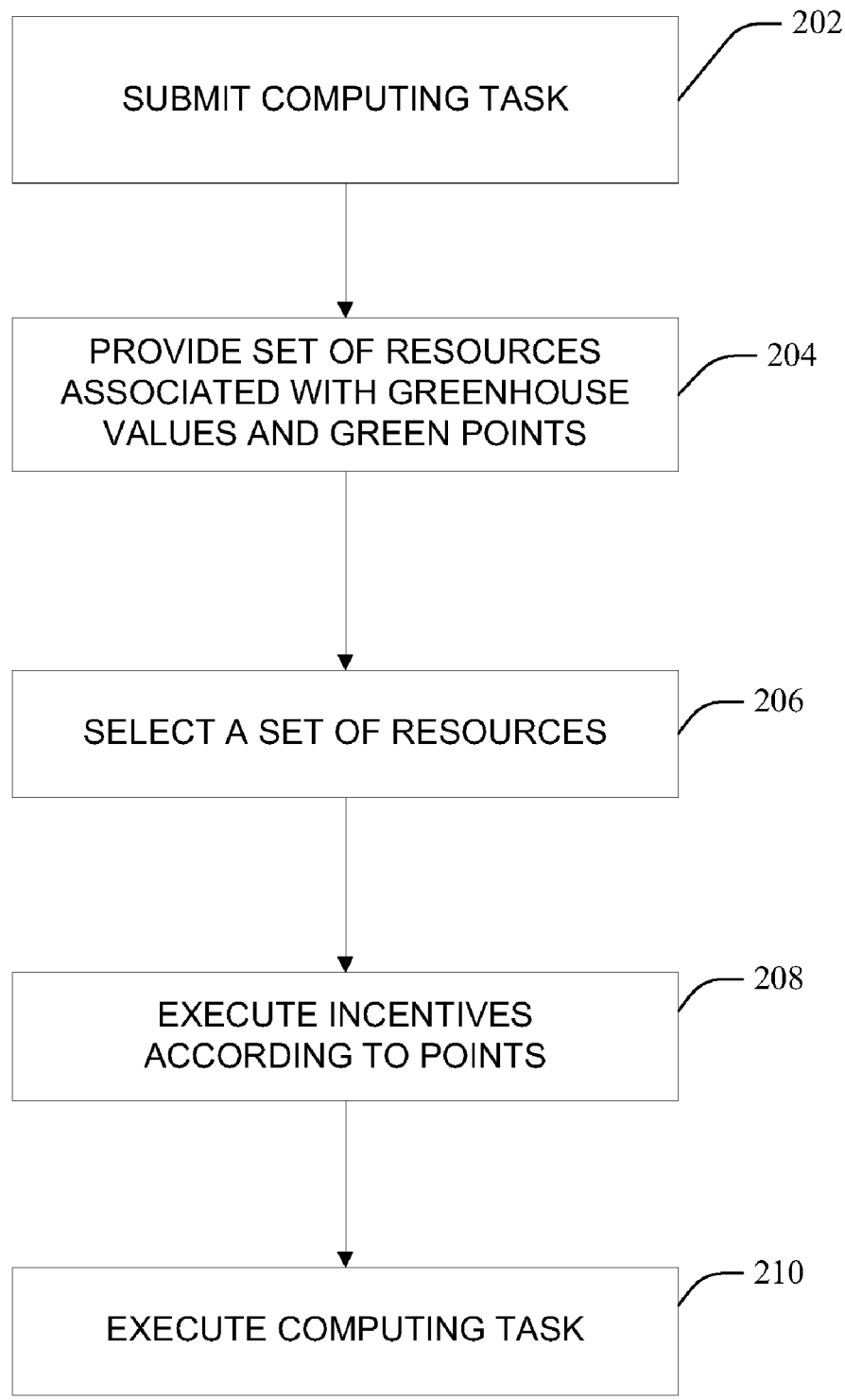
FIG. 2 is a flow chart illustrating a method for enabling users to compare the green efficiency metrics of multiple computing tasks and selecting resources as a function thereof according to an embodiment of the invention.

The drawings are not necessarily to scale. The drawings are merely schematic representations, not intended to portray specific parameters of the invention. The drawings are intended to depict only typical embodiments of the invention and, therefore, should not be considered as limiting the scope of the invention. In the drawings, like numbering represents like elements.

DETAILED DESCRIPTION OF THE INVENTION

For convenience, the Detailed Description of the Invention has the following sections:
I. General Description; and
II. Computerized Implementation.

I. General Description

The present application discloses systems, methods, devices and program products for enabling users of a computing system to measure and compare the green efficiency of a set of resources used in a computing task. With the use of this information, the user can select a desired set of resources to be employed in the computing task to minimize the environmental impact of computing tasks in relation to requirements. In some embodiments, the invention creates metrics for measuring the greenness of a computing task. The metrics are calculated through analysis of the resource computation, energy consumption, consequence of computation, and dimensional characteristics of a computing task. The metrics could be detrimental or beneficial metrics that permit the user or a processing system to make scheduling and execution decisions.

The metrics could be comprised of many factors relating to the computing task itself and a variety of external factors. Once a metric is created, it may enable comparison of the value of a proposed computing task with other options, and values, for that task. The metric values may then be used to make better decisions for the resources used during a computational task. A standard "greenness" measurement may also be used to compare and reward multiple users for the relative impact of their computing tasks.

Referring now to FIG. 1, an embodiment of the method, system or process for measuring and comparing the efficiency of a set of resources used in a computing task is illustrated. At 102, metrics are calculated for each of a plurality of resources available for performing a computing task, based upon inputs relevant to a function of a computing system (for example, a computing system 304 illustrated in FIG. 3 and described below). At 104, one or more of the resource options is selected through comparison of relative resource and performance metrics. Resource option selection at 104 comprises selecting available computing resources as well as their configurations and specific operating parameters, and at 106 the task is performed using the selected resources.

The inputs include, but are not limited to, the amount of time or computer cycles required to complete a computing task, the time of day the computing task is performed, the geographic location where the computing task is performed, network usage, heat generated during the computing task, the amount of paper printed from a computing task, and other tasks scheduled to run concomitantly as the computing task. Other inputs appropriate for use will be apparent to one skilled in the art.

The amount of time or computer cycles required to complete a computing task may be selected as an input to the function because the amount of time or computer cycles required linearly relates to the power consumption for that task. Furthermore, in cases where additional hardware needs to be boarded to handle tasks, power consumption may be more than linear and spike at threshold points. Power consumption requires power generation, which may incur a cost and be harmful to the environment. Consumption may be measured by external devices which monitor the energy used during a task versus idle computer time. Other methods for measuring power consumption use tables that include known information such as the power a computer uses per CPU cycle, network data transmitted, and hard disk access. This value is most likely an estimate when the function is used to estimate the energy and resource consumption of a task, but could be measured empirically during or after a task is complete.

The time of day may be selected as an input to the function because performing a computing task during certain times of the day may result in less detriment to the environment. When overall power consumption for a power generation location is lower, the weather is cooler, or computing resources are being utilized fully, less resources may be consumed for execution of a computing task. Such data is likely obtained from an external source using known methods, such as web services.

The geographic location for a computing task may be selected as an input to the function because different geographic locations may execute computing tasks while consuming fewer resources and with less detriment to the environment than other locations. Such locations may have less power consumption, more environmentally friendly power generation, excess power capacity, less need for cooling, or proximity to other locations needed to connect to over a network. Geographic location information may be used when a computing task may be executed in one of a plurality of locations. Such data is likely obtained from an external source using known methods, such as web services.

Network usage may be selected as an input to the function because network usage causes other computers and computing equipment outside the measurable realm of the current task to use resources and power. Network usage could be measured on bytes transferred and hops needed to reach the destination. A hop is one portion of the path a given piece of data must travel between source and destination in a computer network. Generally, the more hops the data must traverse to reach its destination, the greater the transmission delay incurred and power consumed. This information may be obtained using known methods by the computer running the current task. Such methods include counting the transmitted bytes and detecting the number of hops using known methodologies such as "trace route." This data may be estimated before the task is started, but may be measured during execution of the task for a final value.

The heat generated by a computing task may be selected as an input to the function because computing tasks generate heat which must generally be offset with a cooling process. A cooling process may use additional power and possibly chemicals which may contribute to excess greenhouse gases. The heat generated by the computing task may be measured by a computer's internal thermometers or other sensors which monitor CPU or component temperatures. Changes in these temperatures during the task may be used to calculate the heat generated by the task. Alternatively or additionally, a fraction of the computer's heat may be allocated to the task, such as by calculating the percentage of the computer's resources executing the task. This data may be estimated prior to task execution, but may also be measured during execution of the task for final value.

The amount of printed paper from a computing task may be selected as an input to the function because the amount of printed paper results in a measurable decrease in the number of trees and resources used in recycling. In addition, toner or ink cartridges consumed, power, and heat generated may also be selected as inputs. The number of printed pages from a computing task may be estimated before the task is started, but may also be accurately measured during execution of the task.

Other scheduled tasks may be selected as inputs to the function in one aspect because other tasks could affect the estimated consumption if run concomitantly with the computing task. For example, if the task under consideration is the only task for a period of time, the power consumption or heat generated may be more since the machine on which the task is being executed incurs an overhead in power and heat to wake from idle. The increase in these metrics may be substantial over idle usage for a set machine. However, if other tasks are run at the same time, it is likely that power and heat levels will increase incrementally versus no other tasks running, since multiple tasks will not incur additional wake from idle overhead power and heat. However, nearing maximum power storage unit (PSU) wattage, the power efficiency begins to decline, and so computing tasks after peak efficiency will result in greater power and heat. Similarly, tasks that cause memory resources to reach their maximum, therefore causing memory tasks to be paged to a hard disk drive (HDD), will result in greater power and heat. This data may be estimated before the task is started, but may also be measured during execution of the task for a final value.

It should be understood that in embodiments of the invention, a metric function could be run during or after the computing task. The metric function can calculate, record, and transmit the metric values to an aggregator of green computing data. The aggregate green computing data can be for further use in any of the methods and systems described herein or in any other methods and systems not described herein.

In an embodiment of the invention, the method and system could be used to help users running computing tasks to identify the best time, place, and structure of the task itself to reduce resource consumption. Embodiments may also contain an application or function that takes inputs from multiple sources and returns a "greenness" metric value, and further offers suggestions for increasing this metric value, wherein a user may change values to find the best combination of resources to meet a need for completing the task and doing so with the desired level of environmental impact. Embodiments may also monitor each task run and calculate a final metric value, compare it to an initial estimate, and determine what caused any differences, or use the metric value to adjust the estimation algorithm. The selection of resources may be through user input, such as via a dialog box or wizard form. Alternatively, selection may be automated based on user preference, such as maximum speed, maximum energy efficiency, dynamic based on a target goal, and even more granular criteria, such as filtered by data and time, application, and the like.

Referring now to FIG. 2, one embodiment compares the relative success or failure of different computing tasks in terms of greenness. In this situation, the method or process may attach a point value related to the greenness metric and a history of similar tasks. These point values may be used to reward or provide other incentives to individuals or institutions. For example, points could be used internally in a company to proactively reward task owners who are more efficient at creating green tasks, or to charge back to a task owner's project, department, or other organization. Specifically, the method or process includes at 202 submitting a computing task to be evaluated by the computing system 304 (FIG. 3). Examples of computing tasks that are submitted for evaluation include browsing the web, a long computation, logging onto a virtual world site or performing a search of memory means or network resources in communication with a computer application. At 204, the user is provided with a set of resources with greenhouse values and green points. At 206, the user selects a set of resources to be used in executing the submitted task. At 208, the user is provided with the incentives based upon the set of resources selected in step 206. At 210, the computing task is executed using the set of resources selected.

Note that many of these steps may be performed by a service provider that aggregates information from various sources. For example, a service provider may acquire information from computers associated with nodes in a grid about their respective green value. This may require a standard or interface to which manufacturers of computers comply.

Green points may be traded or redeemed for awards; for example, a user who defers his job until the evening may acquire green points. Another user may be provided with other incentives for choosing a less efficient but faster/higher performing resource set. Thus, in one aspect, users are empowered to make an appropriate green or less efficient choice for each task based on their needs, offering flexibility in accomplishing green computing while still enabling a user to pay for less efficiency/high performance when needed as determined by that user.

The user may give points to a friend or colleague, or apply points toward purchase of a book, for example, from a retailer or services provider who agrees with a point aggregator on a point value. The user may send points to their employer for a potential reward, or keep points in a point cache for later use. The point cache may be a database that records points along with other information, for example, how the points were acquired. Such information may be encrypted, and a point distribution service may be made secure using prior-art methods associated with keeping monetary values secure in an Internet setting.

II. Computerized Implementation

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as JAVA®, SMALLTALK®, C++™ or the like and conventional procedural programming languages, such as the "C"™ programming language or similar programming languages. The program code may execute entirely on the user's computer, partly on the user's computer, as a stand-alone software package, partly on the user's computer and partly on a remote computer or entirely on the remote computer or server. Thus, embodiments of the present invention comprise methods, apparatus (e.g. systems, devices, etc.) and computer program products. For example, it will be understood that each block of the flowchart illustrations and/or block diagrams of the figures, including FIGS. 1-3 as described above, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring now to FIGS. 1-3, the flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to FIG. 3, an exemplary computerized implementation includes a computer system 304 deployed within a computer infrastructure 308 such as a computer or a programmable device such as a personal digital assistant (PDA) or cellular phone. This is intended to demonstrate, among other things, that the present invention could be implemented within a network environment 340 (e.g., the Internet, a wide area network (WAN), a local area network (LAN), a virtual private network (VPN), etc.) in communication with one or more additional computers 336, or on a stand-alone computer infrastructure 308. In the case of the former, communication throughout the network 340 can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet.

As shown, the computer system 304 includes a central processing unit (CPU) 312, a memory 316, a bus 320, and input/output (I/O) interfaces 324. Further, the computer system 304 is shown in communication with external I/O devices/resources 328 and storage system 332. In general, the processing unit 312 executes computer program code, such as the code to implement various components of the process and system for measuring and comparing resource metrics used in a computing task and selecting resources as a function thereof as illustrated in FIGS. 1 and 2 and described above, and which is partially stored in registers 352, 354, and 356 of memory 316 and/or storage 332. and/or storage system 332. It is to be appreciated that two or more, including all, of these components may be implemented as a single component.

While executing computer program code, the processing unit 312 can read and/or write data to/from the memory 316, the storage system 332, and/or the I/O interfaces 324. The bus 320 provides a communication link between each of the components in computer system 304. The external devices 328 can comprise any devices (e.g., keyboard, pointing device, display, etc.) that enable a user to interact with computer system 304 and/or any devices (e.g., network card, modem, etc.) that enable computer system 304 to communicate with one or more other computing devices.

For example, one external device 328 could be a display for providing the user with the metric values that were calculated by CPU 312 using inputs to the function. In addition, one of the external devices 328 could be a keyboard for allowing a user to enter estimated data for each of the inputs prior to or while the metric values are being calculated. The keyboard could also be used to input the user's selection of a set of resources to be used for the computing task based upon a selected metric value. The inputs to the function may also be data received via network 340 from other sources such as computers 336 or another computer network such as the Internet.

The computer infrastructure 308 is only illustrative of various types of computer infrastructures for implementing the invention. For example, in one embodiment, computer infrastructure 308 comprises two or more computing devices (e.g., a server cluster) that communicate over a network to perform the various process steps of the invention. Moreover, computer system 304 is only representative of various possible computer systems that can include numerous combinations of hardware.

To this extent, in other embodiments, the computer system 304 can comprise any specific purpose-computing article of manufacture comprising hardware and/or computer program code for performing specific functions, any computing article of manufacture that comprises a combination of specific purpose and general-purpose hardware/software, or the like. In each case, the program code and hardware can be created using standard programming and engineering techniques, respectively. Moreover, the processing unit 312 may comprise a single processing unit, or be distributed across one or more processing units in one or more locations, e.g., on a client and server. Similarly, the memory 316 and/or the storage system 332 can comprise any combination of various types of data storage and/or transmission media that reside at one or more physical locations.

Further, I/O interfaces 324 can comprise any system for exchanging information with one or more of the external device 328. Still further, it is understood that one or more additional components (e.g., system software, math co-processing unit, etc.) not shown in FIG. 3 can be included in computer system 304. However, if computer system 304 comprises a handheld device or the like, it is understood that one or more of the external devices 328 (e.g., a display) and/or the storage system 332 could be contained within computer system 304, not externally as shown.

The storage system 332 can be any type of system (e.g., a database) capable of providing storage for information under the present invention. To this extent, the storage system 332 could include one or more storage devices, such as a magnetic disk drive or an optical disk drive. In another embodiment, the storage system 332 includes data distributed across, for example, a local area network (LAN), wide area network (WAN) or a storage area network (SAN) (not shown). In addition, although not shown, additional components, such as cache memory, communication systems, system software, etc., may be incorporated into computer system 304.

Still yet, computer infrastructure 308 is intended to demonstrate that some or all of the components of implementation could be deployed, managed, serviced, etc. by a service provider who offers to implement, deploy, and/or perform the functions of the present invention for others, for example by licensing methods and browser or application server technology according to the present invention to an internet service providers (ISP) or cellular telephone provider. In one embodiment, the invention may comprise a business method that performs the process steps of the invention on a subscription, advertising, and/or fee basis. Thus, a service provider can create, maintain, support, etc., a computer infrastructure, such as the computer infrastructure 308 that performs the process steps of the invention for one or more customers, and in return the service provider can receive payment from the customer(s) under a subscription and/or fee agreement and/or the service provider can receive payment from the sale of advertising content to one or more third parties.

The invention also provides for computer-implemented methods according to the present application. In this case, a computer infrastructure, such as computer infrastructure 308, can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as computer system 304, from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for selection of networked processing resources for executing a processing task, the method comprising:
determining, via a processing unit, resource metric values for performing a processing task for each of a plurality of networked processing resources as a function of a time of day that the processing task is to be performed, an amount of time needed to complete the processing task, an amount of computer cycles required to complete the processing task, respective numbers of other tasks scheduled to run on each of the processing resources concomitantly as the processing task at the time of day of the processing task, respective amounts of heat generated by the processing resources in executing the processing task, and respective numbers of network usage hops that data must traverse with respect to each of the processing resources in executing the processing task;
comparing the metric values via the processing unit; and
selecting via the processing unit a best at least one of the processing resources and a best time during the time of day that the processing task is to be performed for performing the task as a function of the comparing indicating that they require a least total amount of resources to cool while executing the amount of computer cycles required to complete the processing task over the number of network usage hops that the data must traverse during the amount of time needed in view of the number of other tasks scheduled to run concomitantly when performing the processing task; and
causing via the processing unit the selected best at least one of the processing resources to perform the task at the selected best time.

2. The method of claim 1, wherein the selecting the best time during the time of day that the processing task is to be performed for performing the task comprises selecting a first time of day when overall power consumption for a power generation location of a one of the selected best at least one processing resource is lower than another, unselected second time of day as a function of different respective weather temperatures.

3. The method of claim 1, wherein the selecting the best at least one processing resource for performing the processing task comprises selecting a first of the processing resources at a geographic location having less power consumption, more environmentally friendly power generation, excess power capacity, less need for cooling, or a closer proximity to other locations needed to connect to over a network, than another of the processing resources.

4. The method of claim 1, wherein the selecting the best at least one processing resource for performing the processing task comprises selecting a first of the processing resources having a lower number of the network usage hops that the data must traverse with respect to each of the processing resources in executing the processing task, than another of the processing resources.

5. The method of claim 1, wherein the selecting the best at least one processing resource for performing the processing task comprises selecting a first of the processing resources that generates less amount of heat in executing the processing task, or that requires less additional resources to cool the generated heat, than another of the processing resources.

6. The method of claim 1, wherein the selecting the best at least one processing resource for performing the processing task comprises selecting a first of the processing resources that has at least one other task scheduled to run concomitantly when performing the processing task, over another of the processing resources that is idle at the best time.

7. A method for providing a service for selection of networked processing resources for executing a processing task, the method comprising:
provide a processing unit in communication with a computer readable memory and a tangible computer-readable storage device;
wherein the processing unit, when executing program instructions stored on the tangible computer-readable storage device via the computer readable memory:
determines resource metric values for performing a processing task for each of a plurality of networked processing resources as a function of a time of day that the processing task is to be performed, an amount of time needed to complete the processing task, an amount of computer cycles required to complete the processing task, respective numbers of other tasks scheduled to run on each of the processing resources concomitantly as the processing task at the time of day of the processing task, respective amounts of heat generated by the processing resources in executing the processing task, and respective numbers of network usage hops that data must traverse with respect to each of the processing resources in executing the processing task;
compares the metric values; and
selects a best at least one of the processing resources and a best time during the time of day that the processing task is to be performed for performing the task as a function of the comparing indicating that they require a least total amount of resources to cool while executing the amount of computer cycles required to complete the processing task over the number of network usage hops that the data must traverse during the amount of time needed in view of the number of other tasks scheduled to run concomitantly when performing the processing task; and
causing via the processing unit the selected best at least one of the processing resources to perform the task at the selected best time.

8. The method of claim 7, wherein the processing unit, when executing the program instructions stored on the tangible computer-readable storage device via the computer readable memory, further selects the best time during the time of day that the processing task is to be performed for performing the task by selecting a first time of day when overall power consumption for a power generation location of a one of the selected best at least one processing resource is lower than another, unselected second time of day as a function of different respective weather temperatures.

9. The method of claim 7, wherein the processing unit, when executing the program instructions stored on the tangible computer-readable storage device via the computer readable memory, further selects the best at least one processing resource for performing the processing task by selecting a first of the processing resources at a geographic location having less power consumption, more environmentally friendly power generation, excess power capacity, less need for cooling, or a closer proximity to other locations needed to connect to over a network, than another of the processing resources.

10. The method of claim 7, wherein the processing unit, when executing the program instructions stored on the tangible computer-readable storage device via the computer readable memory, further selects the best at least one processing resource for performing the processing task by selecting a first of the processing resources having a lower number of the network usage hops that the data must traverse with respect to each of the processing resources in executing the processing task, than another of the processing resources.

11. The method of claim 7, wherein the processing unit, when executing the program instructions stored on the tangible computer-readable storage device via the computer readable memory, further selects the best at least one processing resource for performing the processing task by selecting a first of the processing resources that generates less amount of heat in executing the processing task, or that requires less additional resources to cool the generated heat, than another of the processing resources.

12. The method of claim 7, wherein the processing unit, when executing the program instructions stored on the tangible computer-readable storage device via the computer readable memory, further selects the best at least one processing resource for performing the processing task by selecting a first of the processing resources that has at least one other task scheduled to run concomitantly when performing the processing task, over another of the processing resources that is idle at the best time.

13. A system, comprising:
a processing unit in communication with a computer readable memory and a tangible computer-readable storage device;
wherein the processing unit, when executing program instructions stored on the tangible computer-readable storage device via the computer readable memory:
determines resource metric values for performing a processing task for each of a plurality of networked processing resources as a function of a time of day that the processing task is to be performed, an amount of time needed to complete the processing task, an amount of computer cycles required to complete the processing task, respective numbers of other tasks scheduled to run on each of the processing resources concomitantly as the processing task at the time of day of the processing task, respective amounts of heat generated by the processing resources in executing the processing task, and respective numbers of network usage hops that data must traverse with respect to each of the processing resources in executing the processing task;
compares the metric values; and
selects a best at least one of the processing resources and a best time during the time of day that the processing task is to be performed for performing the task as a function of the comparing indicating that they require a least total amount of resources to cool while executing the amount of computer cycles required to complete the processing task over the number of network usage hops that the data must traverse during the amount of time needed in view of the number of other tasks scheduled to run concomitantly when performing the processing task; and causing via the processing unit the selected best at least one of the processing resources to perform the task at the selected best time.

14. The system of claim 13, wherein the processing unit, when executing the program instructions stored on the computer-readable storage medium via the computer readable memory, further selects the best time during the time of day that the processing task is to be performed for performing the task by selecting a first time of day when overall power consumption for a power generation location of a one of the selected best at least one processing resource is lower than another, unselected second time of day as a function of different respective weather temperatures.

15. The system of claim 13, wherein the processing unit, when executing the program instructions stored on the computer-readable storage medium via the computer readable memory, further selects the best at least one processing resource for performing the processing task by selecting a first of the processing resources at a geographic location having less power consumption, more environmentally friendly power generation, excess power capacity, less need for cooling, or a closer proximity to other locations needed to connect to over a network, than another of the processing resources.

16. The system of claim 13, wherein the processing unit, when executing the program instructions stored on the computer-readable storage medium via the computer readable memory, further selects the best at least one processing resource for performing the processing task by selecting a first of the processing resources having a lower number of the network usage hops that the data must traverse with respect to each of the processing resources in executing the processing task, than another of the processing resources.

17. The system of claim 13, wherein the processing unit, when executing the program instructions stored on the computer-readable storage medium via the computer readable memory, further selects the best at least one processing resource for performing the processing task by selecting a first of the processing resources that generates less amount of heat in executing the processing task, or that requires less additional resources to cool the generated heat, than another of the processing resources.

18. The system of claim 13, wherein the processing unit, when executing the program instructions stored on the computer-readable storage medium via the computer readable memory, further selects the best at least one processing resource for performing the processing task by selecting a first of the processing resources that has at least one other task scheduled to run concomitantly when performing the processing task, over another of the processing resources that is idle at the best time.

19. An article of manufacture, comprising:
a computer readable tangible storage device having computer readable program code embodied therewith, the computer readable program code comprising instructions that, when executed by a computer processing unit, cause the computer processing unit to:
determine resource metric values for performing a processing task for each of a plurality of networked processing resources as a function of a time of day that the processing task is to be performed, an amount of time needed to complete the processing task, an amount of computer cycles required to complete the processing task, respective numbers of other tasks scheduled to run on each of the processing resources concomitantly as the processing task at the time of day of the processing task, respective amounts of heat generated by the processing resources in executing the processing task, and respective numbers of network usage hops that data must traverse with respect to each of the processing resources in executing the processing task;
compare the metric values; and
select a best at least one of the processing resources and a best time during the time of day that the processing task is to be performed for performing the task as a function of the comparing indicating that they require a least total amount of resources to cool while executing the amount of computer cycles required to complete the processing task over the number of network usage hops that the data must traverse during the amount of time needed in view of the number of other tasks scheduled to run concomitantly when performing the processing task; and
causing via the processing unit the selected best at least one of the processing resources to perform the task at the selected best time.

20. The article of manufacture of claim 19, wherein the computer readable program code instructions, when executed by the computer processing unit, further cause the computer processing unit to select the best time during the time of day that the processing task is to be performed for performing the task by selecting a first time of day when overall power consumption for a power generation location of a one of the selected best at least one processing resource is lower than another, unselected second time of day as a function of different respective weather temperatures.

21. The article of manufacture of claim 19, wherein the computer readable program code instructions, when executed by the computer processing unit, further cause the computer processing unit to select the best at least one processing resource for performing the processing task by selecting a first of the processing resources at a geographic location having less power consumption, more environmentally friendly power generation, excess power capacity, less need for cooling, or a closer proximity to other locations needed to connect to over a network, than another of the processing resources.

22. The article of manufacture of claim 19, wherein the computer readable program code instructions, when executed by the computer processing unit, further cause the computer processing unit to select the best at least one processing resource for performing the processing task by selecting a first of the processing resources having a lower number of the network usage hops that the data must traverse with respect to each of the processing resources in executing the processing task, than another of the processing resources.

23. The article of manufacture of claim 19, wherein the computer readable program code instructions, when executed by the computer processing unit, further cause the computer processing unit to select the best at least one processing resource for performing the processing task by selecting a first of the processing resources that generates less amount of heat in executing the processing task, or that requires less additional resources to cool the generated heat, than another of the processing resources.

24. The article of manufacture of claim 19, wherein the computer readable program code instructions, when executed by the computer processing unit, further cause the computer processing unit to select the best at least one processing resource for performing the processing task by selecting a first of the processing resources that has at least one other task scheduled to run concomitantly when performing the processing task, over another of the processing resources that is idle at the best time.

* * * * *